April 29, 1941.  L. P. MILLARD  2,239,926
AXLE FOR HARVESTER-THRESHERS
Filed July 8, 1939   2 Sheets-Sheet 1
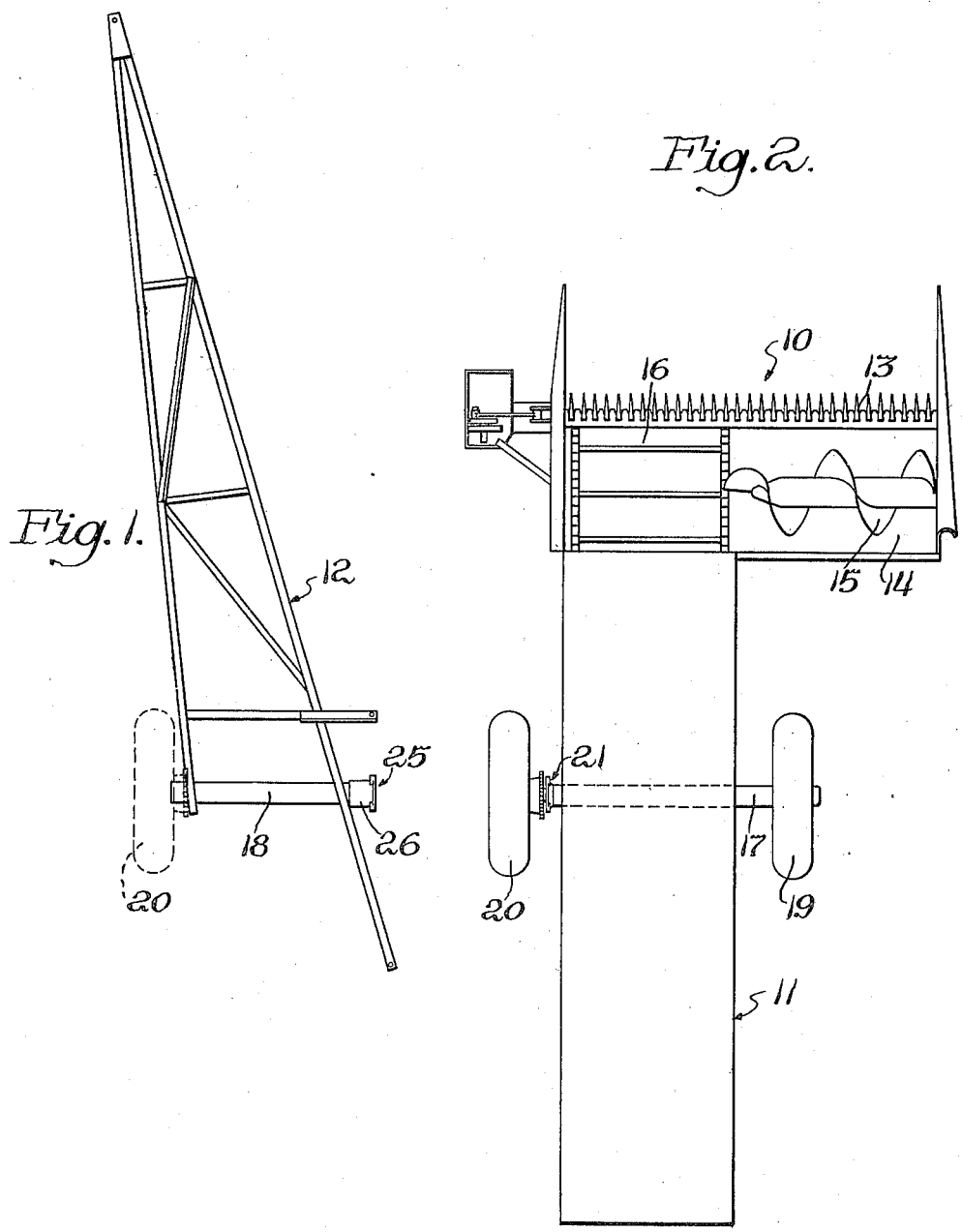

April 29, 1941.  L. P. MILLARD  2,239,926
AXLE FOR HARVESTER-THRESHERS
Filed July 8, 1939  2 Sheets-Sheet 2
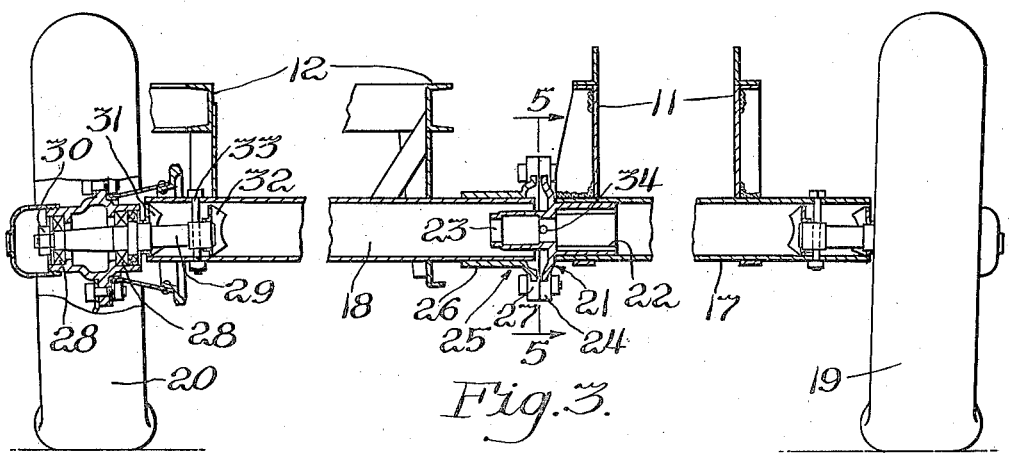
Fig. 3.
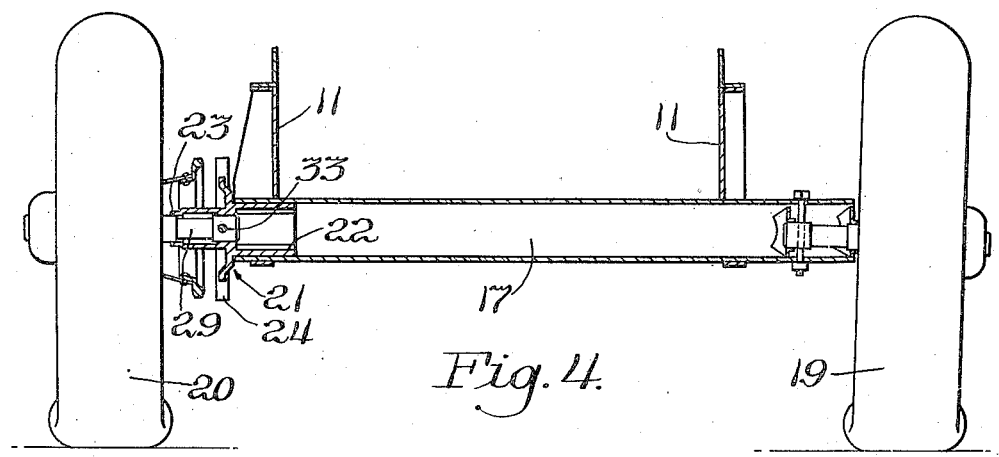
Fig. 4.
Fig. 5.
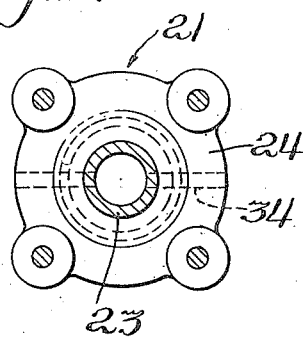
Inventor
Lee P. Millard
By Paul O. Pippel
Atty.

Patented Apr. 29, 1941

2,239,926

UNITED STATES PATENT OFFICE 2,239,926

AXLE FOR HARVESTER-THRESHERS

Lee P. Millard, Moline, Ill., assignor to International Harvester Company, a corporation of New Jersey Application July 8, 1939, Serial No. 283,433

2 Claims. (Cl. 56—228)

This invention relates to harvester-threshers. More specifically it relates to an axle construction for a harvester-thresher which will permit easy transport and handling of the harvester-thresher.

Certain types of harvester-threshers embody a harvester, a thresher, a draft frame at the side of the thresher, and a wheel supported axle extending beneath the combined width of the thresher and the draft frame. A separation of the thresher and the draft frame would by virtue of the reduced width of both thresher and draft frame enable both to be handled more easily during transport or shipping.

An object of the present invention is to provide an improved harvester-thresher.

Another object is the provision of a harvester-thresher of such construction that it may be easily separated into component parts which are more easily handled during transport of shipping because of their narrow width.

According to the present invention, the axle which extends beneath and supports the draft frame and thresher body of the harvester-thresher is made in two parts which extend, respectively, the width of the draft frame and the thresher body. For the sake of easy handling the parts of the axle are separated, and the wheel, positioned adjacent the draft frame in normal operation of the harvester-thresher, is attached at the side of the thresher body and together with the wheel already attached to the axle at the other side of the thresher body serves as rolling support for the thresher body. Thus the harvester-thresher is reduced in width an amount equal to the width of the draft frame, and its handling during shipping or transport is facilitated.

In the drawings—

Figure 1 is a plan view of a draft frame;

Figure 2 is a plan view of a harvester-thresher without a draft frame;

Figure 3 is a central, vertical section taken through the axle of a harvester-thresher with a draft frame attached;

Figure 4 is a similar section of a harvester-thresher without a draft frame; and, Figure 5 is a section taken along the line 5—5 of Figure 3.

The harvester-thresher of the present invention is shown in separate parts in Figures 1 and 2 and comprises a header or harvester 10, a thresher body 11, and a draft frame 12. For a more complete showing of this type of machine, attention is directed to Millard Patent 2,135,621, November 8, 1938. The header comprises a reciprocatory cutter 13, a platform 14, an auger feed 15, and an endless conveyor 16.

The thresher body 11 and draft frame 12 are carried by an axle formed in two parts or sections 17 and 18 supported on wheels 19 and 20. As seen in Figure 3, there is a member 21 having a portion 22 sleeved within the axle part 17, a portion 23 extending into but not contacting the axle part 18, and a portion 24 extending radially outwardly from the parts 17 and 18. A member 25 has a portion 26 sleeved on the part 18 and a portion 27 extending radially outwardly from the parts 17 and 18 and bolted to the portion 24 of the member 21. The members 21 and 25 serve to connect the parts 17 and 18 of the axle to one another.

The wheel 20 is journaled in roller bearings 28 on a stub axle shaft in the form of a pin 29, being secured thereby by a nut 30 threaded to the end of the pin. The pin 30 in turn is carried in the end of the axle part 18 of the axle by members 31 and 32 and is secured to the part 18 by the bolt 33 passing through the pin. The wheel 19 is joined to the axle part 17 in a similar manner.

When it is desired to separate the draft frame from the harvester-thresher as shown in igures 1 and 2, a jack is placed under the end of the axle part 17 which is attached to axle part 18. The bolts connecting the members 21 and 25 are removed, and the draft frame 12 is moved away from the thresher body 11. Then the wheel 20 is detached from the axle part 18 after removal of bolt 33. The wheel 20 is now secured at the side of the thresher body 11 to the axle part 17 with the pin 29 extending within portion 23 of the member 21 and the bolt 33 extending through openings 34 in the member 21 and the pin 29 so as to lock the pin and member together. The jack is removed from beneath the axle part 17 and the harvester-thresher now stands as shown in Figures 2 and 4, transportable and of reduced width. The reduced width facilitates shipping. During manufacture of the harvester-thresher, the parts may be assembled as shown in Figures 1, 2, and 4, and the machine may be shipped to its intended point of use where it is completely assembled.

The intention is to limit the invention only within the scope of the appended claims.

What is claimed is:

1. A two wheel supported harvester thresher comprising a transverse tubular axle having its ends provided with respective stub axles on each of which a supporting wheel is journaled, a thresher part mounted on one portion of the tubular axle, a draw frame mounted at the side of the thresher part on the remaining portion of the tubular axle, said tubular axle between the draw frame and thresher part being separable, means at said location for separably connecting the proximate inner ends of the tubular axle, said tubular axle part which supports the thresher part carrying at its separable end a sleeve part normally extending into the other separable part of the tubular axle when said tubular axle parts are connected, said draw frame supporting tubular axle part being removable bodily from the thresher part supporting tubular axle portion, means detachably connecting the wheel of said removable part to said removable part whereby said latter wheel when detached may be transferred to the free end of the thresher part supporting axle and have its stub axle inserted into the sleeve of the thresher supporting tubular axle part, and means to secure the said stub axle part in said sleeve, whereby the tread of the two wheel harvester thresher is materially narrowed for transport.

2. A two wheel supported harvester thresher comprising a transverse tubular axle having its ends provided with respective stub axles on each of which a supporting wheel is journaled, a thresher part mounted on one portion of the tubular axle, a draw frame mounted at the side of the thresher part on the remaining portion of the tubular axle, said tubular axle between the draw frame and thresher part being separable, means at said location for separably connecting the proximate inner ends of the tubular axle, said tubular axle part which supports the thresher part carrying at its separable end a journal for a stub axle, said draw frame supporting part being bodily removable from the thresher part supporting tubular axle portion, means detachably connecting the wheel of said removable part to said removable part whereby said latter wheel when detached may be transferred to the free end of the thresher part supporting axle and have its stub axle received by the journal of the thresher supporting tubular axle part, and means to secure the said stub axle part to said journal whereby the tread of the two wheel harvester thresher is materially narrowed for transport.

LEE P. MILLARD.